United States Patent
Tsai (10) Patent No.: US 6,529,292 B1
(45) Date of Patent: Mar. 4, 2003

(54) APPARATUS AND METHOD FOR LOCATING AN OPTICAL MODULE OF AN IMAGE-SCANNING SYSTEM

(75) Inventor: Jenn-Tsair Tsai, Taipei Hsien (TW)

(73) Assignee: Mustek Systems Inc., Hsinchu (TW)

( * ) Notice: Subject to any disclaimer, the term of this patent is extended or adjusted under 35 U.S.C. 154(b) by 0 days.

(21) Appl. No.: 09/432,551

(22) Filed: Nov. 3, 1999

(30) Foreign Application Priority Data

Nov. 4, 1998 (TW) .......................................... 87118370

(51) Int. Cl.⁷ .............................. H04N 1/00; H04N 1/04; G06K 9/20
(52) U.S. Cl. ...................... 358/406; 358/406; 358/486; 358/474; 382/317
(58) Field of Search ................................ 358/406, 486, 358/474; 382/317

(56) References Cited

U.S. PATENT DOCUMENTS

| | | | |
|---|---|---|---|
| 4,464,681 A | * 8/1984 | Jacobs et al. | 358/406 |
| 4,605,970 A | * 8/1986 | Hawkins | 358/406 |
| 4,641,357 A | * 2/1987 | Satoh | 235/436 |
| 4,922,087 A | * 5/1990 | Nakajima et al. | 250/201.4 |
| 6,175,429 B1 | * 1/2001 | Nagaharu et al. | 358/475 |
| 6,178,015 B1 | * 1/2001 | Lee et al. | 358/406 |

\* cited by examiner

*Primary Examiner*—Edward Coles
*Assistant Examiner*—H. Safaipour
(74) *Attorney, Agent, or Firm*—Ladas & Parry (57) ABSTRACT

The adjusting apparatus and method of the present invention are used to carry out boundary adjustment, horizontal position adjustment, and resolution adjustment, wherein the track deviations can be detected by showing waveforms corresponding to the illumination of the scanned image of the adjusting apparatus on an oscilloscope. Moreover, the blank block region provided in the center of the adjusting apparatus can be used in conjunction with the blank regions provided at two sides of the adjusting apparatus for analyzing the illuminations of the scanned image at the center and two sides of the image-receiving device.

7 Claims, 10 Drawing Sheets

APPARATUS AND METHOD FOR LOCATING AN OPTICAL MODULE OF AN IMAGE-SCANNING SYSTEM

BACKGROUND OF THE INVENTION

1. Field of the Invention

The present invention relates in general to an adjusting apparatus and a locating method. More particularly, it relates to an adjusting apparatus and a locating method for locating a lens set and image-receiving device in a optical module of an image-scanning system.

2. Description of the Related Art

Figure 1:
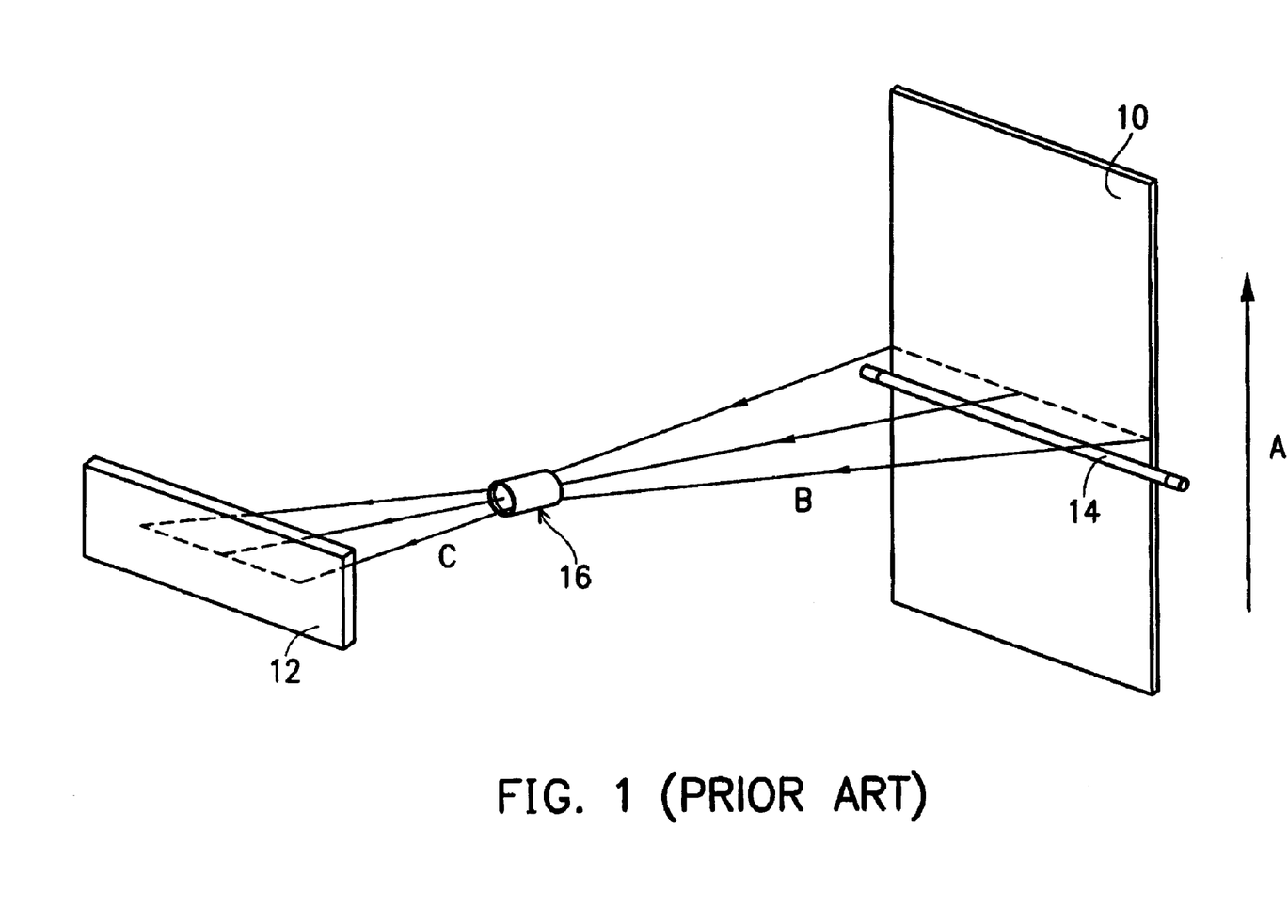
FIG. 1 shows an image-scanning system.

FIG. 1 shows an image-scanning system, which comprises a light-radiating device 14, a image-receiving device 12, and a lens set 16. The image-receiving device 12 and the lens set 16 constitute an optical module of the image-scanning system. The light-radiating device 14 may be a cold-cathode tube having a straight line tube. For instance, the image-receiving device 12 may be a charge-coupled device (CCD).

The light-radiating device 14 moves with respect to an object 10 which is, for example, a piece of paper or a picture, along a scanning path as indicated by arrow A. The object 10 reflects the light emitted by the light-radiating device 14, as indicated by arrows B. The lens set 16 then focuses an image of the reflected light onto the image-receiving device 12 as indicated by arrow C. The image-receiving device 12 transforms the image of the reflected light (the image of the object 10) into electrical signal for further processing.

The location of the lens set 16 and the image receiving device 12 is essential to the proper functioning of the optical module. First, if the position of the lens set 16 or the image-receiving device 12 has any deviation with respect to the object 10, then the scanned image will suffer in quality. Second, if the image-receiving device 12 is not located at the required position, then the lens set 16 can not properly focus the image of the reflected light onto the image-receiving device 12, which therefore cannot receive the scanned image. Furthermore, the lens set 16 must be located at the position where the lens set 16 provides best resolution and appropriate magnification to focus the image of the reflected light onto the image-receiving device 12; if not, the image received by the image-receiving device 12 will be vague or even distorted due to the variation of the light intensity. Consequently, an adjust apparatus is always used for locating the lens set and the image-receiving device in an optical module of an image-scanning system, thereby eliminating problems such as horizontal deviation of image, received image over the boundary of the image-receiving device, and inadequate magnification and resolution for the image.

Figure 2:
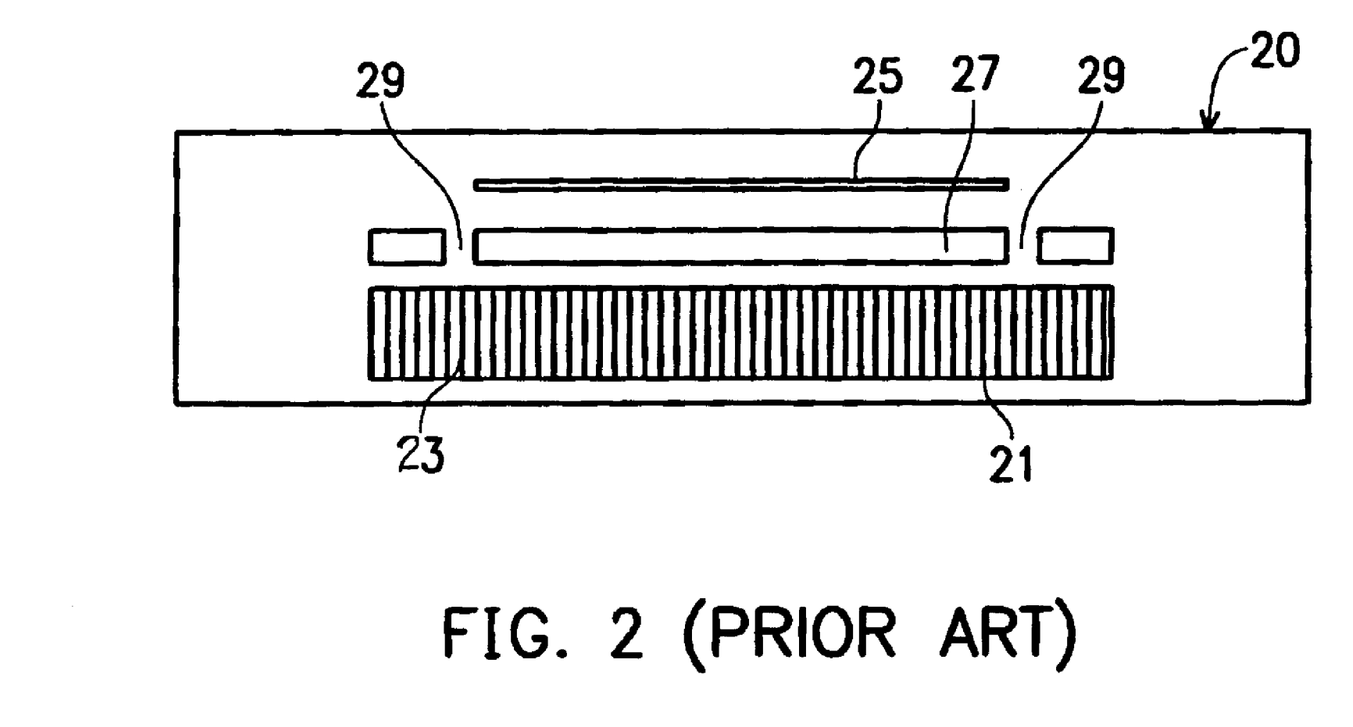
FIG. 2 shows an adjusting apparatus used in conventional arts.

FIG. 2 illustrates an adjusting apparatus used in conventional arts. In FIG. 2, the adjusting apparatus 20 comprises three patterns 25, 27, and 21 provided in parallel and horizontally. Patterns 25 and 27 are used to calibrate the horizontal location of the image-receiving device. Two blank regions 29 are provided at two sides of the pattern 27, and used to calibrate the boundary location of the image-receiving device. The pattern 21 is used to calibrate the resolution; it comprises a plurality of vertical segments 23 disposed in parallel for analyzing resolution. The adjusting apparatus 23 serves as an scanned object when carrying out location process of the lens set and the image-receiving device. The location process includes calibrating the boundary, horizontal position, and the resolution of the image-receiving device and the lens set. In practice, the adjusting apparatus must be moved corresponding to the different location procedures. For example, the adjusting apparatus is moved to a first position such that the scanning line aims at the pattern 27 when locating the boundary of the image-receiving device; and the adjusting apparatus is moved to a second position such that the scanning line aims at the pattern 21 when analyzing the resolution of the image-receiving device and the lens set. Every procedure for locating different item requires additional movement of the adjusting apparatus, therefore increasing the possibility of deviated results due to frequent movement of the adjusting apparatus. Furthermore, the conventional locating process takes a lot of time to calibrate the corresponding positions among the lens set, the image-receiving device, and the adjusting apparatus, thus increasing the time cost.

In addition, analog-to-digital converters are generally used to compensate the light saturation for different illuminations at the image-receiving device when fabricating the image-scanning system (for example a scanner). However, the illumination at the center of the image-receiving device is brighter than that at the edge of the image-receiving device, and the illumination difference will cause the scanned image at the image-receiving device to suffer from color deviation, because the linear region of the analog-to-digital converters have their limits for the compensating process. In addition, the adjusting apparatus depicted in FIG. 2 can not provide the data to analyze the ratio of the illumination at the center of the image-receiving device to that at the edge of the image-receiving device.

SUMMARY OF THE INVENTION

Therefore, a first object of the present invention is to provide a adjusting apparatus for locating the optical module (a lens set and an image-receiving device), and analyzing the illumination of the scanned image present at the center and two sides of the image-receiving device.

The second object of the present invention is to provide a locating method operating in conjunction with the adjusting apparatus which indicates the adjusting results by showing waveforms on an oscilloscope, thereby improving the accuracy and speed of location process.

To achieve the first object, the adjusting apparatus for locating a lens set and an image-receiving device provided in an optical module of an image-scanning system and analyzing illumination comprises at least the following units:

A first adjusting pattern provided at the center of the adjusting apparatus comprising at least: a white block region provided at the center of the first adjusting pattern for locating the central position of the optical module; and resolution regions provided at both sides of the white block region, for analyzing the resolution of the lens set.

Second adjusting patterns provided at both ends of the first adjusting pattern, for adjusting the boundary and horizontal location of the image-receiving device in the optical module.

Each of the second adjusting patterns comprises at least: two horizontal-deviation adjusting pattern; wherein each of the horizontal-deviation adjusting patterns comprises a first pattern for adjusting the horizontal position and deviation of the image-receiving device when disposed in the optical module, and a second pattern spaced apart from the first pattern; a boundary adjusting pattern for locating the boundary of the image-receiving device when disposed in the optical module, wherein the boundary adjusting pattern comprises the region between the first and second patterns.

The white block region is used in conjunction with the boundary adjusting patterns for detecting the illuminations projected at the center and two sides of the image-receiving device for analyzing the illumination difference between the center and two sides of the image-receiving device.

To achieve the second object, the method for locating the image-receiving device and the lens set and analyzing resolution comprises the following steps:

Provide the lens set between the adjusting apparatus and the image-receiving device such that the adjusting apparatus, the lens set, and the image-receiving device are coarsely aligned along a first direction.

Move the position of the image-receiving device, along a second direction perpendicular to the first direction, until the scanned image projected from the adjusting apparatus can be received by the image-receiving device.

Move the lens set along the first direction for coarsely adjusting the position of the lens set, until a third waveform responsive to the illumination presented at the image-receiving device has greatest amplitude at the central portion of the third waveform;

Move the image-receiving device along the second direction for coarsely adjusting the position of the image-receiving device, until the first waveform appears.

Fine adjust the position of the lens set along the first direction thereby making the central portion of the first waveform with largest amplitude.

Fine adjust the position of the image-receiving device along the second direction, until the second waveform appears, thereby achieving the location of the lens set and image-receiving device; and Measure the amplitudes at the central portion of the second waveform and at both sides of the second waveform, thereby analyzing illumination difference.

BRIEF DESCRIPTION OF THE DRAWINGS

The following detailed description, given by way of example and not intended to limit the invention solely to the embodiments described herein, will best be understood in conjunction with the accompanying drawings, in which.

DETAILED DESCRIPTION OF THE PREFERRED EMBODIMENTS

Figure 3:
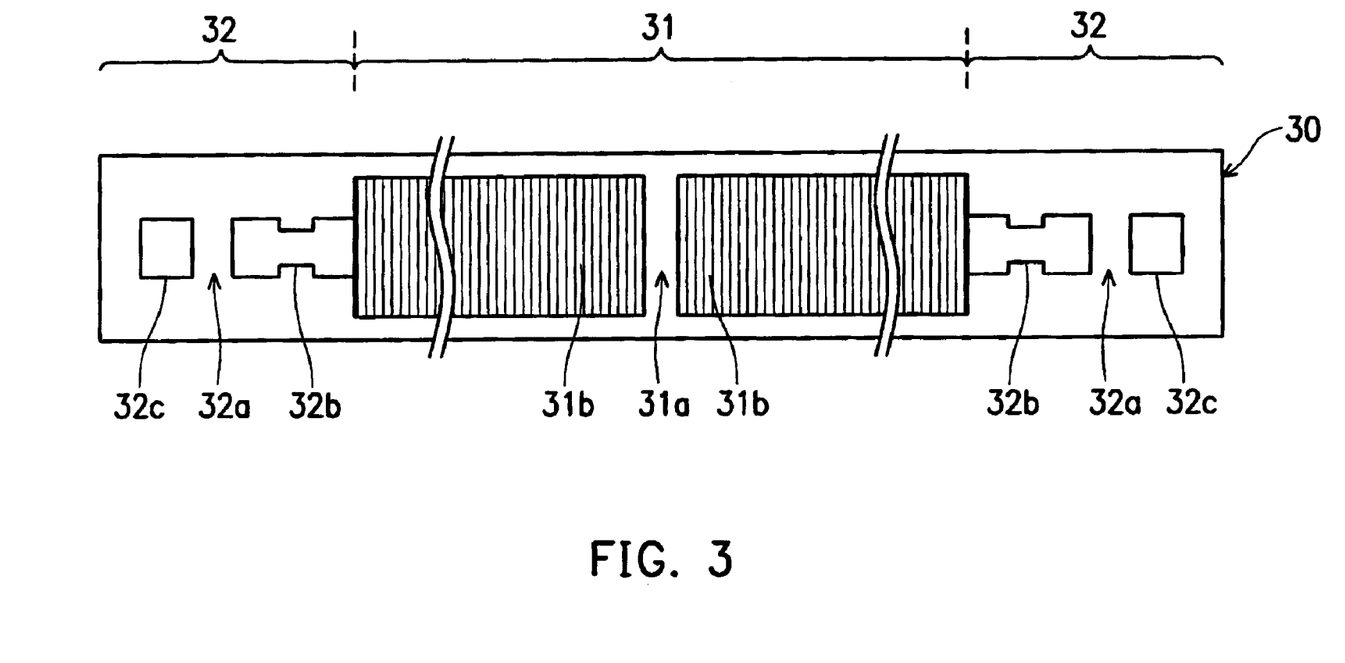
FIG. 3 shows an adjusting apparatus according to a first embodiment of the present invention.

FIG. 3 shows an adjusting apparatus according to a first embodiment of the present invention. The adjusting apparatus 30 comprises: a first adjusting pattern 31 provided at the center of the adjusting apparatus 30; and two second adjusting patterns 32 provided at both ends of the first adjusting pattern 31 for adjusting the boundary and horizontal location of the image-receiving device in an optical module of an image-scanning system.

The first adjusting pattern 31 comprises at least: a white block region 31a provided at the center of the first adjusting pattern 31 for locating the central position of the optical module, and two resolution regions 31b provided at both sides of the white block region 31a for analyzing the resolution of a lens set in the optical module of the image-scanning system. In this embodiment, each of the resolution regions 31b includes a plurality of segments (lines patterns in parallel to the white block region 31a) disposed in parallel and separated by an equal distance, wherein the density of the segments depends on the required resolution of the image-receiving system. Moreover, the segments also can be disposed to have a specific angle with respect to the white block region 31a.

Each of the second adjusting pattern 32 comprises: a boundary adjusting patterns 32a for locating the boundary of the image-receiving device when disposed in the optical module; and a horizontal-deviation adjusting pattern. The horizontal-deviation adjusting pattern comprises a first pattern 32b for adjusting the horizontal position and deviation of the image-receiving device; and a second pattern 32c spaced apart from the first pattern 32b. The blank region between the first pattern 32b and the second pattern 32c serves as the boundary adjusting pattern 32a. In this embodiment, each of the first patterns 32b is a black region in the shape of 'H', and the second pattern 32c is a rectangular black region.

FIGS. 4A to 4E show the light tracks reflected from the adjusting apparatus 30, and the waveforms corresponding to different deviations on the light track. Each of the light tracks (41~47) represents the projection of the scanned image of the adjusting apparatus 30 received by the image-receiving device when the lens set, the image-receiving device, and the adjusting apparatus 30 are located in certain corresponding positions.

Figure 4A:
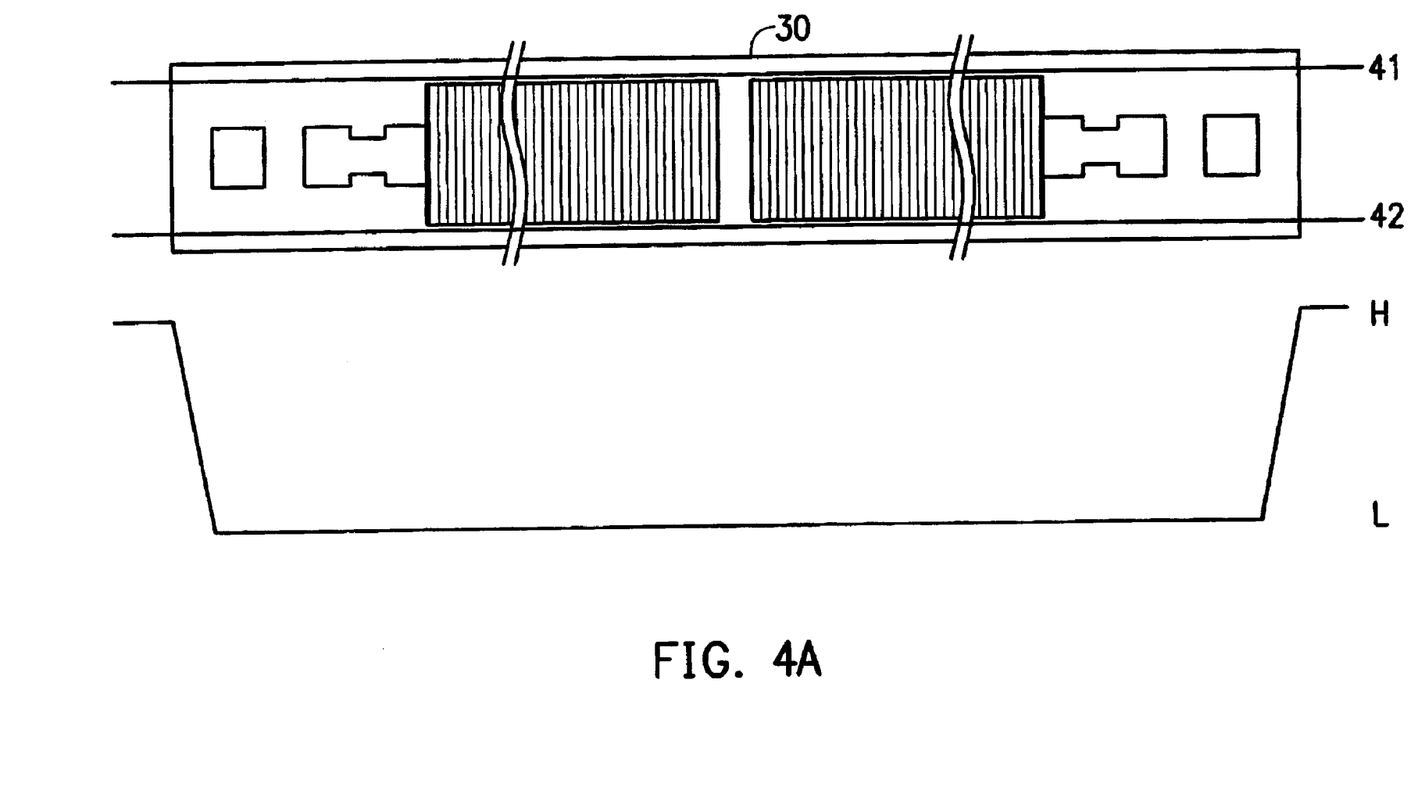
FIGS. 4A to 4E show the light tracks reflected onto the adjusting apparatus, and the corresponding waveforms.
Figure 4B:
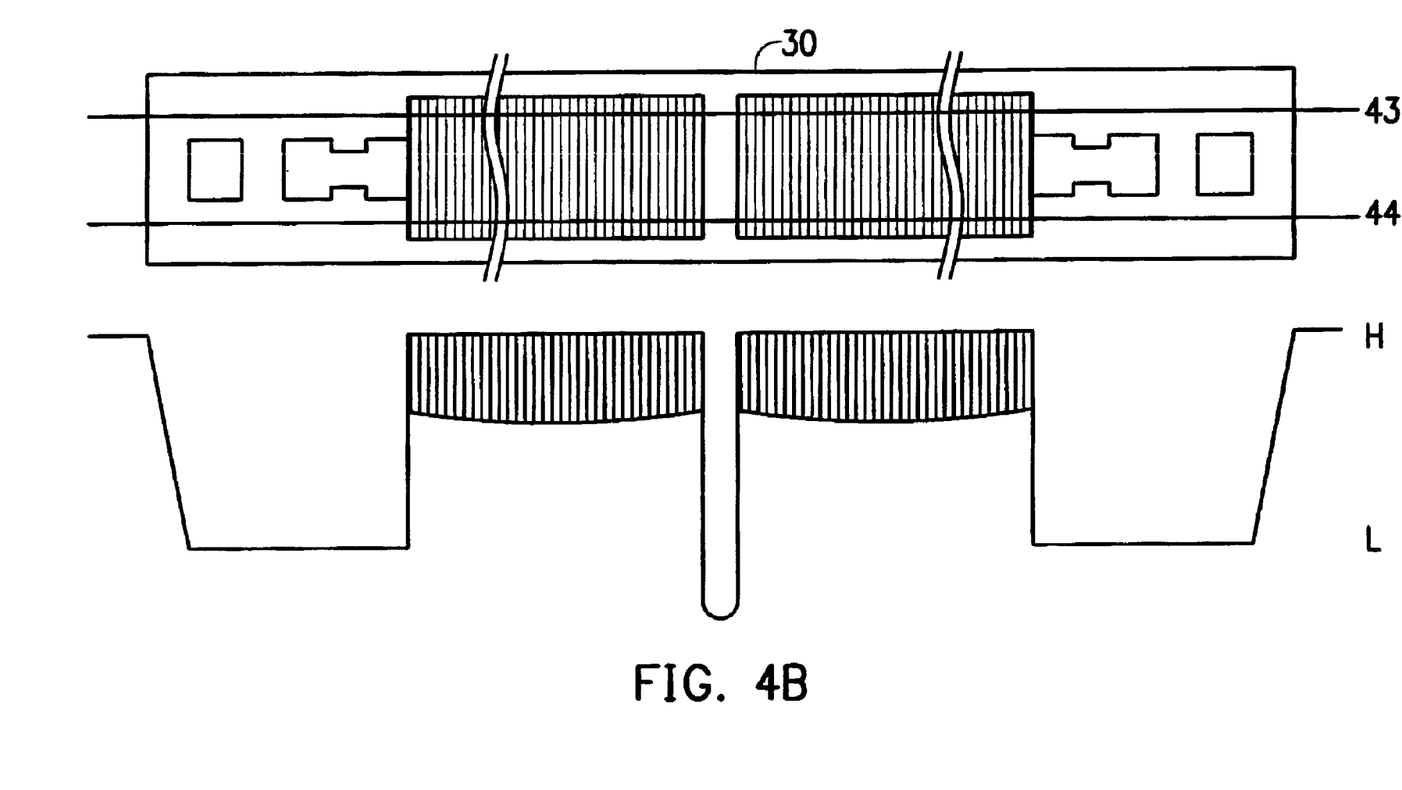
Figure 4C:
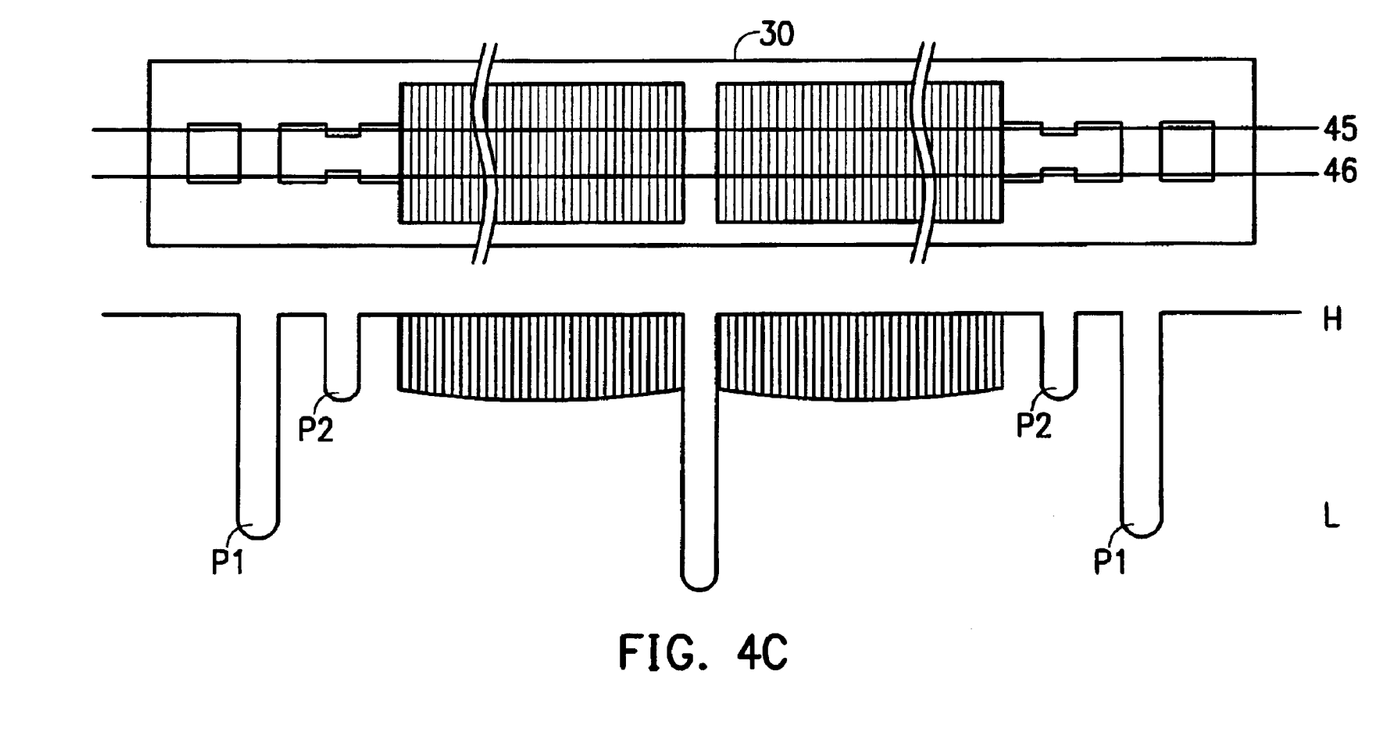
Figure 4D:
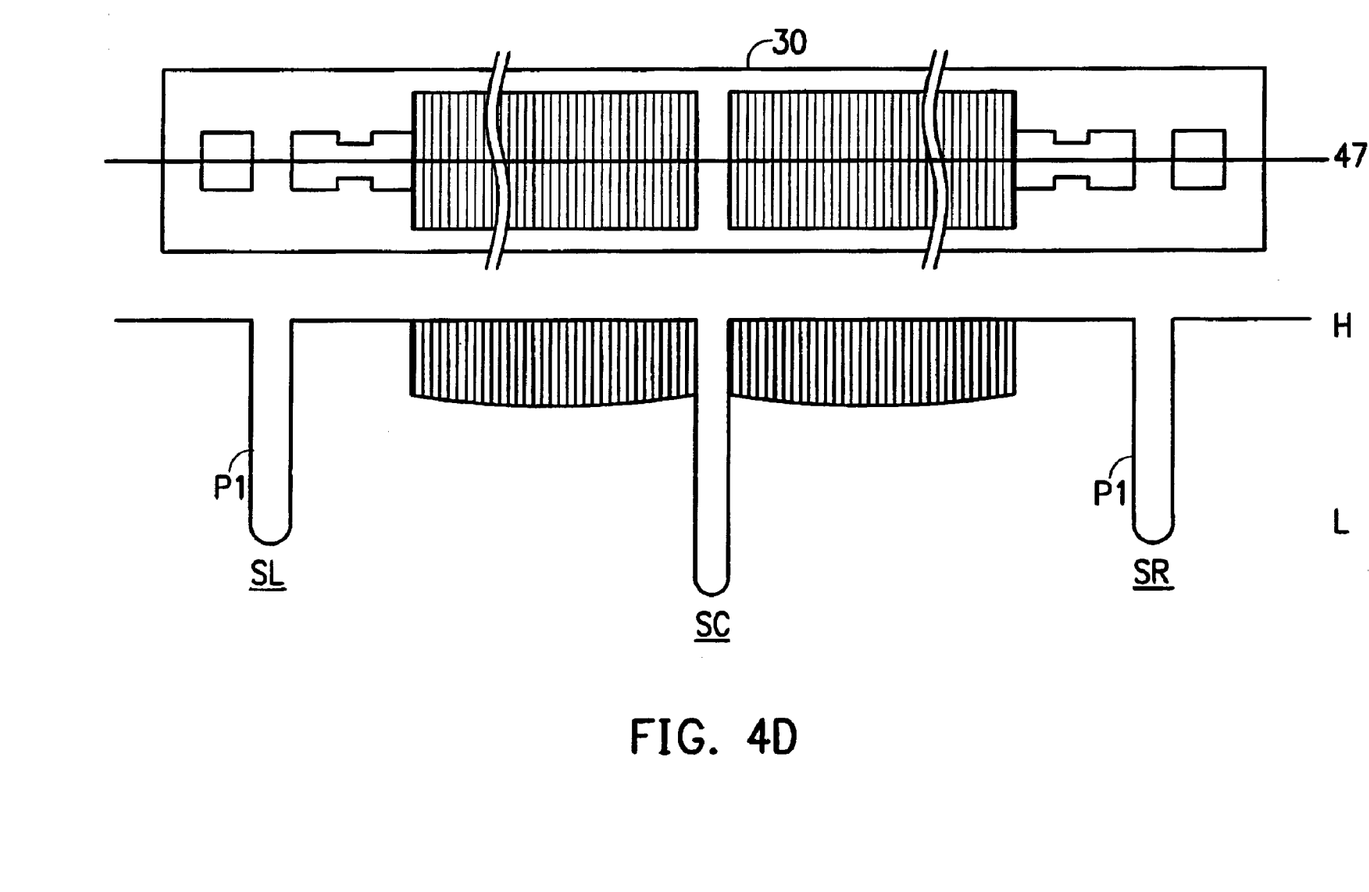
Figure 4E:
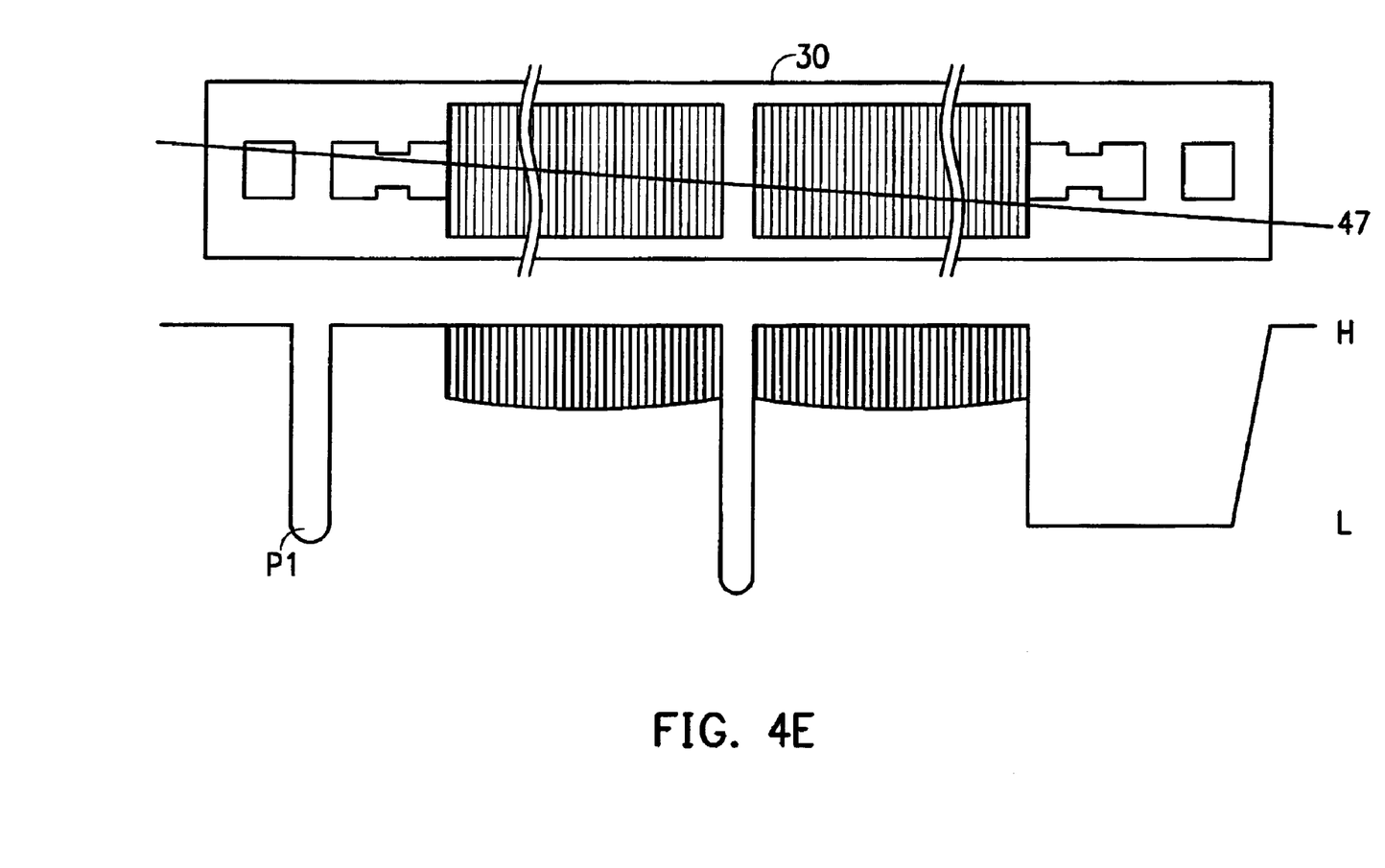

The light-radiating device projects light onto the adjusting apparatus 30. The image (on the scanning line) of the adjusting apparatus 30 is reflected to the image-receiving device via focusing of the lens set. The reflected image is received by the image-receiving device and transformed into an electrical signal, and the corresponding waveform of the electrical signal can shown via an oscilloscope. The scanned blank (for example white) region will cause a high voltage level H or a low voltage level L shown in the oscilloscope. In this embodiment, the scanned blank region will cause a low voltage level L, and the scanned black region will cause a high voltage level H. Therefore, the different light tracks (41~47) on the adjusting apparatus 30, depending on the deviation or boundary locations of the optical module, will cause different corresponding waveforms (as shown in FIGS. 4A~4D) to be shown by the oscilloscope. If the optical module (the lens set and image-receiving device) is appropriately located, the proper waveform indicating no deviation is generated by the oscilloscope, as shown in FIG. 4D.

In FIG. 4D, notations SC, SL, and SR respectively indicate the illuminations at the center, left side, and right side of the reflected image of the adjusting apparatus 30 received by the image-receiving device. The values of SC, SL, and SR can be measured from the oscilloscope. Then the right-side illumination ratio (SR/SC), and the left-side illumination ratio (SL/SC) are calculated and used to analyze whether the illumination meets the specification.

Figure 5:
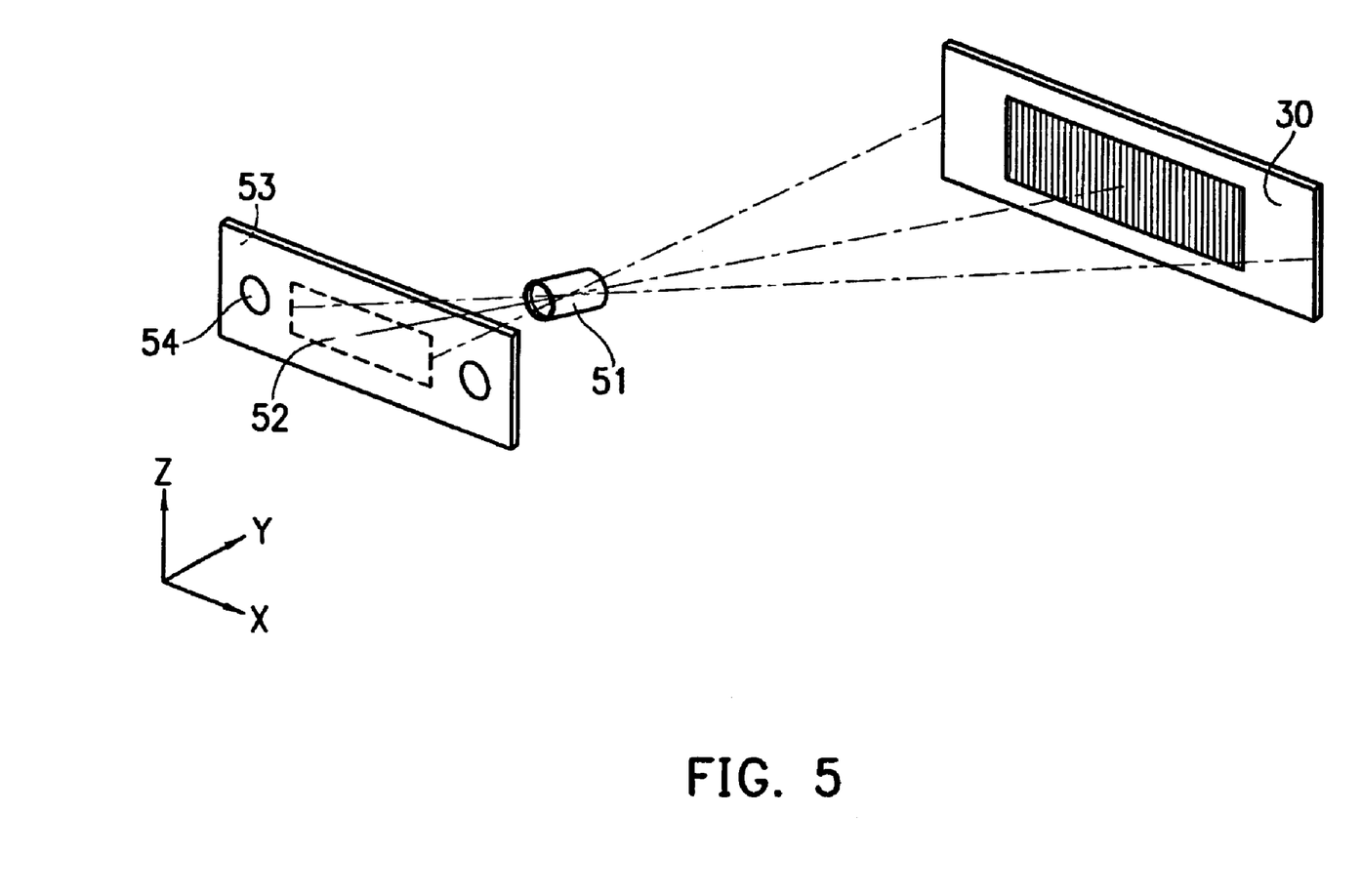
FIG. 5 schematically shows the arrangement when carrying out the location via the method according to the present invention.

The adjusting apparatus 30 is disposed at the position where the scanned object is placed when carrying out the location of the lens set 51 and the image-receiving device 52, as depicted in FIG. 5. The image-receiving device 52, a charge-coupled device for example, general is disposed on a circuit board 53. The position of the image-receiving device 52 is adjusted via the tuning device 54 on the circuit board 53.

According to the locating method of the present invention, the lens set 51 is provided between the adjusting apparatus 30 and the image-receiving device 52, close to the focus distance of the lens set 51. Then the adjusting apparatus 30, the lens set 51, and the image-receiving device 51 are coarsely aligned along the Y direction. At this time, the waveform shown in an oscilloscope may be the same as that depicted in FIG. 4A. It is obviously that the patterns on the adjusting apparatus 30 is not scanned to the image-receiving device 52.

Adjust the position of the image-receiving device 52 via the tuning device 54 repeatedly, along the Z and X directions, until the reflected image of the adjusting apparatus 30 can be received by the image-receiving device 52. At this time, the waveform shown in the oscilloscope may be the same as that depicted in FIG. 4B (but its central portion my have not a greatest peak now). It is obviously that the patterns on the adjusting apparatus 30 is scanned to the image-receiving device 52, but not well located.

Coarsely adjust the position of the lens set 51 by moving the lens set back and forth along the Y direction to make the waveform (FIG. 4B) shown on the oscilloscope has a greatest peak at the center of the waveform.

Coarsely adjusting the position of the image-receiving device 52 by moving the image-receiving device 52 along the Z and X directions to locating the center and boundary of the image-receiving device 52. During adjusting period, the waveform shown in the oscilloscope may be the same as that depicted in FIG. 4E. When the oscilloscope shows the waveform with peaks P1 and P2 as depicted in FIG. 4C, the coarse location of the image-receiving device 52 is completed. The image-receiving device 52 is almost located to a horizontal and central position for receiving the reflected image of the adjusting apparatus 30, and the boundary of the adjusting apparatus 30 can be totally reflected to the image-receiving device 52.

Fine adjust the lens set 51 by moving the lens set back and forth along the Y direction to make the waveform shown on the oscilloscope has a greatest peak at the center of the waveform, thereby obtaining the best resolution of the lens set 51 for focus the adjusting apparatus 30.

Then fine adjust the image-receiving device 52 by moving the image-receiving device 52 along Z and/or X directions repeatedly. When the oscilloscope shows the waveform merely having peaks P1 as depicted in FIG. 4D, the image-receiving device 52 is located accurately at a central and horizontal position for receiving the reflected image of the adjusting apparatus 30, and the image boundary of the adjusting apparatus 30 can be totally reflected to the image-receiving device 52. The left-side illumination ratio (SL/SC) and the right-side illumination ratio (SR/SC) can be obtain from the waveform depicted in FIG. 4D, thereby achieving the analysis of illumination. Moreover, because the boundary of the scanned object is determined, therefore the magnification of the image-scanning system can be obtained.

Figure 6:
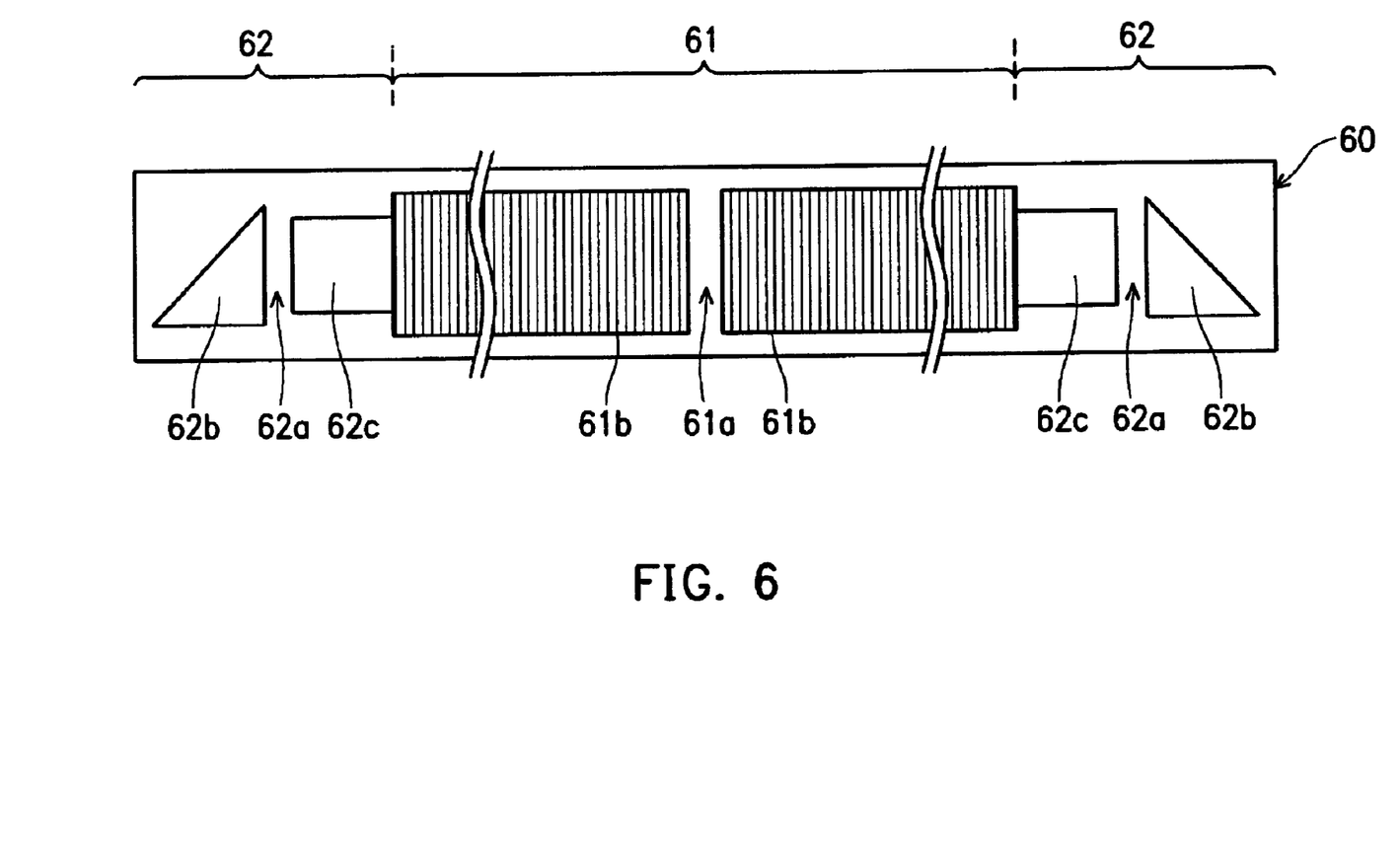
FIG. 6 shows an adjusting apparatus according to a second embodiment of the present invention.

FIG. 6 shows an adjusting apparatus according to a second embodiment of the present invention. The adjusting apparatus 60 comprises: a first adjusting pattern 61 provided at the center of the adjusting apparatus; and two second adjusting patterns 62 provided at both ends of the first adjusting pattern 61 for adjusting the boundary and horizontal location of the image-receiving device in an optical module of an image-scanning system.

The first adjusting pattern 61 comprises at least: a white block region 61a provided at the center of the first adjusting pattern 61, for locating the central position of the optical module, and resolution regions 61b provided at both sides of the white block region 61a, for analyzing the resolution of a lens set in the optical module of the image-scanning system. In this embodiment, each of the resolution regions 61b includes a plurality of segments (lines patterns in parallel to the white block region 61a) disposed in parallel and separated by an equal distance, and the density of the segments depends on the required resolution of the image-receiving system. Moreover, the segments can also be disposed to have a specific angle with respect to the white block region 61a.

Each of the second adjusting pattern 62 comprises: a boundary adjusting patterns 62a for locating the boundary of the image-receiving device when disposed in said optical module; and two horizontal-deviation adjusting patterns. Each of the horizontal-deviaton adjusting patterns comprises a first pattern 62b for adjusting the horizontal position and deviation of the image-receiving device; and a second pattern 62c provided spaced apart from the first pattern 62a. The blank region between the first pattern 62b and the second pattern 62c serves as the boundary adjusting pattern 62a. In this embodiment, each of the first pattern 62b is a triangular black region, and the second pattern 62c is a rectangular black region.

The present invention has the following advantages:

(1) The boundary, resolution, illumination, horizontal deviation, and magnification can all be observed or detected;

(2) The light tracks due to different deviation correspond to the waveforms which can be directly shown in a oscilloscope, thereby improving the accuracy and speed locating the optical module.

While the invention has been described by way of examples and in terms of the preferred embodiment, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. An adjusting apparatus for locating a lens set and an image-receiving device provided in an optical module of an image-scanning system and analyzing illumination and resolution, comprising at least:

a first adjusting pattern provided at the center of said adjusting apparatus comprising at least:

a white block region provided at the center of said first adjusting pattern, for locating the central position of said optical module, and resolution regions provided at both sides of said white block region, for analyzing the resolution of said lens set;

second adjusting, patterns provided at both ends of said first adjusting pattern, for adjusting the boundary is and horizontal location of said image-receiving device in said optical module; wherein each of said second adjusting patterns comprises at least:

two horizontal-deviation adjusting patterns; wherein each of said horizontal-deviation adjusting patterns comprises a first pattern for adjusting the horizontal position and deviation of said image-receiving device when disposed in said optical module, and a second pattern spaced apart from said first pattern;

a boundary adjusting pattern for locating the boundary of said image-receiving device when disposed in said optical module; wherein said boundary adjusting pattern comprises the region between said first and second patterns;

wherein said white block region is used in conjunction with said boundary adjusting patterns for detecting the illuminations projected at the center and two sides of said image-receiving device for analyzing the illumination difference between the center and two sides of said image-receiving device.

2. The adjusting apparatus as claimed in claim 1, wherein said first pattern is an 'H' shaped region disposed close to said resolution regions, and said second pattern is a black region.

3. The adjusting apparatus as claimed in claim 1, wherein said second pattern is a black region disposed close to said resolution regions, and said first pattern is a black triangular region.

4. A locating method using an adjusting apparatus for locating a lens set and an image-receiving device provided in an optical module of an image-scanning system and analyzing illumination difference and resolution; wherein the scanned image of said adjusting apparatus is projected to said image-receiving device and the illumination of said scanned image presented at said image-receiving device is transformed into waveform and shown by using an oscilloscope; said oscilloscope shows a first waveform when the coarse location of said image-receiving device is completed, and shows a second waveform when the fine location of said lens set and said image-receiving device is complete; said locating method comprising the steps of:

provided said lens set between said adjusting apparatus and said image-receiving device such that said adjusting apparatus, said lens set, and said image-receiving device are coarsely aligned along a first direction;

moving the position of said image-receiving device, along a second direction perpendicular to said first direction, until said scanned image projected from said adjusting apparatus can be received by said image-receiving device;

moving said lens set along said first direction for coarsely adjusting the position of said lens set, until a third waveform responsive to the illumination presented at said image-receiving device has greatest amplitude at the central portion of said third waveform;

moving said image-receiving device along said second direction for coarsely adjusting the position of said image-receiving device, until said first waveform appears;

fine adjusting the position of said lens set along said first direction thereby making the central portion of said first waveform with largest amplitude;

fine adjusting the position of said image-receiving device along said second direction, until said second waveform appears, thereby achieving the location of said lens set and image-receiving device; and measuring the amplitudes at the central portion of said second waveform and at both sides of said second waveform, thereby analyzing illumination difference.

5. The locating method as claimed in claim 4, wherein said adjusting apparatus comprises: a white block region provided at the center of said first pattern; resolution regions provided at both sides of said white block region; and two horizontal-boundary adjusting patterns provided close to said resolution regions;

wherein each of said horizontal-boundary adjusting patters comprises: two horizontal-deviation adjusting patterns; and a boundary adjusting patterns; each of said horizontal-deviation adjusting patterns comprising a first pattern for adjusting the horizontal position and deviation of said image-receiving device when disposed in said optical module, and a second pattern spaced apart from said first pattern; and said boundary adjusting patterns comprises the blank region between said first and second patterns.

6. The locating apparatus as claimed in claim 4, wherein said first pattern is an 'H' shaped region disposed close to said resolution regions, and said second pattern is a black region.

7. The locating apparatus as claimed in claim 4, wherein said second pattern is a black region disposed close to said resolution regions, and said first pattern is a black triangular region.

* * * * *